United States Patent
Liaw et al.

(10) Patent No.: US 6,837,599 B2
(45) Date of Patent: Jan. 4, 2005

(54) FLASHLIGHT SERVED AS WARNING LIGHT OF BICYCLE

(75) Inventors: Suh Jang Liaw, Taichung (TW); Dih Shuen Liaw, Taichung (TW)

(73) Assignee: Shih Sanyo Enterprise Co., Ltd., Tiachung (TW)

( * ) Notice: Subject to any disclaimer, the term of this patent is extended or adjusted under 35 U.S.C. 154(b) by 62 days.

(21) Appl. No.: 10/456,010

(22) Filed: Jun. 5, 2003

(65) Prior Publication Data

US 2004/0246733 A1 Dec. 9, 2004

(51) Int. Cl.$^7$ ............... B62J 6/00; F21L 4/02; F21V 21/088
(52) U.S. Cl. ............ 362/473; 362/184; 362/191; 362/205; 362/396; 362/545
(58) Field of Search ............... 362/184, 187, 362/188, 190, 191, 158, 202, 205, 267, 396, 473–476, 545, 800

(56) References Cited

U.S. PATENT DOCUMENTS

| | | | | |
|---|---|---|---|---|
| 1,222,458 A | * | 4/1917 | Peterson | 362/474 |
| 4,528,622 A | * | 7/1985 | Bacevius | 362/396 |
| 5,031,080 A | * | 7/1991 | Aikens et al. | 362/187 |
| 5,378,553 A | * | 1/1995 | Shoji | 362/191 |
| 5,477,425 A | * | 12/1995 | Sun et al. | 362/476 |
| 5,735,594 A | * | 4/1998 | Own | 362/202 |
| 6,174,071 B1 | * | 1/2001 | Chan | 362/187 |
| 6,283,620 B1 | * | 9/2001 | Taylor et al. | 362/474 |
| 6,612,714 B1 | * | 9/2003 | Morre et al. | 362/191 |
| 6,626,555 B2 | * | 9/2003 | Yaeger | 362/187 |
| 2003/0189835 A1 | * | 10/2003 | Tsukamoto | 362/475 |

FOREIGN PATENT DOCUMENTS

EP          498358 A1  *  8/1992  ............ B62J/6/00

* cited by examiner

*Primary Examiner*—Alan Cariaso
(74) *Attorney, Agent, or Firm*—Pro-Techtor International Services

(57) ABSTRACT

A warning light of bicycle comprises a flashlight comprising a battery compartment including spaced, arcuate projections around a forward extension, a rear holed tab for connection to a lanyard, and a bottom slot; a cylindrical LED carrier assembly including rear contacts electrically interconnecting cells and LEDs; and a cylindrical head assembly including inner recesses engaged with $ projections by turning the head assembly a small angle about the battery compartment; and a clip assembly releasably secured around a tube component of the bicycle, an upper seat having two arcuate wings for clamping the battery compartment, a latch member inserted into the slot for fastening the flashlight, and a flexible tab adapted to press down to clear the latch member from the slot for disengaging the flashlight from the clip assembly.

4 Claims, 6 Drawing Sheets

FLASHLIGHT SERVED AS WARNING LIGHT OF BICYCLE

BACKGROUND OF THE INVENTION

1. Field of the Invention

The present invention relates to flashlights and more particularly to an improved flashlight with a LED (light-emitting diode) light source also served as a warning light of a bicycle when secured thereto.

2. Description of Related Art

An exploded view of a conventional flashlight is shown in FIG. 1. The flashlight comprises a battery compartment 10 including an externally threaded extension 11 having outer threads 110 and an O-ring 111, a waterproof button 12 on an outer surface, and a rear holed tab 13 for connection to a lanyard or the like so as to facilitate carrying, a battery assembly 20 including two cells 21, a board 22, and two coil springs 23, a cylindrical LED carrier assembly 30 anchored in a forward portion of the battery compartment 10, the LED carrier assembly 30 including an internal LED 31, two rear contacts 33 electrically interconnecting the cells 21 and the LED, and a top switch 32 engaged with the button 12 so that a pressing of the button 12 can cause the switch 32 to turn on the LED 31 for blinking or turn off the LED 31, and a cylindrical head assembly 40 including a front lens for projecting light and inner threads 41 engageable with the outer threads 110 for securing the head assembly 40 to the battery compartment 10 and maintaining a water-tight seal by compressing the O-ring 111.

However, the prior art suffered from several disadvantages. For example, the threaded fastening of the head assembly 40 and the battery compartment 10 may increase time in detaching the head assembly 40 from the battery compartment 10 for then replacing the consumed cells 21. Moreover, there is no provision of means for releasably securing the flashlight to a bicycle component such as crossbar. Thus, it is difficult to secure the prior flashlight to a bicycle. Hence, a need for improvement exists.

SUMMARY OF THE INVENTION

It is an object of the present invention to provide a warning light of a bicycle. The warning light comprises a flashlight comprising a battery compartment including a forward cylindrical shoulder extension, a plurality of projections equally spaced apart around the shoulder extension, each projection having two arcuate side slopes, an O-ring behind the projections, a waterproof button on an outer surface, a rear holed tab for connection to a lanyard, and a bottom slot; a battery assembly including a plurality of cells; a cylindrical LED carrier assembly anchored in a forward portion of the battery compartment, the LED carrier assembly including a plurality of internal LEDs, a plurality of rear contacts electrically interconnecting the cells and the LEDs, and a top switch engaged with the button so that a pressing of the button causes the switch to either turn on the LEDs for blinking or turn off the LEDs; and a cylindrical head assembly including a front lens for projecting light and a plurality of inner recesses each having an arcuate section for facilitating the projection to engage with the recess by passing the arcuate side slope through the arcuate section when turning the head assembly an angle relative to the battery compartment after engaging; and a clip assembly comprising a ring sleeved around a tube component of the bicycle, a latch fastener for fastening the ring on the tube component, an upper seat having two pairs of arcuate wings for clamping the battery compartment, a resilient piece on a forward side of the seat, a latch member on the resilient piece, the latch member being adapted to insert into the slot for fastening the flashlight, and a flexible tab extended forwardly from the seat, the tab being adapted to press down to clear the latch member from the slot for disengaging the flashlight from the clip assembly.

It is another object of the present invention to provide a warning light of a bicycle. The warning light comprises a flashlight comprising a battery compartment including a forward cylindrical shoulder extension, a plurality of projections equally spaced apart around the shoulder extension, each projection having two arcuate side slopes, an O-ring behind the projections, a waterproof button on an outer surface, a rear holed tab for connection to a lanyard, a bottom slot, and a lengthwise groove at either side thereof; a battery assembly including a plurality of cells; a cylindrical LED carrier assembly anchored in a forward portion of the battery compartment, the LED carrier assembly including a plurality of internal LEDs, a plurality of rear contacts electrically interconnecting the cells and the LEDs, and a top switch engaged with the button so that a pressing of the button causes the switch to either turn on the LEDs for blinking or turn off the LEDs; and a cylindrical head assembly including a front lens for projecting light and a plurality of inner recesses each having an arcuate section for facilitating the projection to engage with the recess by passing the arcuate side slope through the arcuate section when turning the head assembly an angle relative to the battery compartment after engaging; and a clip assembly comprising a ring sleeved around a tube component of the bicycle, a latch fastener for fastening the ring on the tube component, an upper seat having an arcuate wing at either side, each wing having a lengthwise top claw engaged with the lengthwise groove for clamping the battery compartment, a resilient piece on a forward side of the seat, a latch member on the resilient piece, the latch member being adapted to insert into the slot for fastening the flashlight, and a flexible tab extended forwardly from the seat, the tab being adapted to press down to clear the latch member from the slot for disengaging the flashlight from the clip assembly.

The above and other objects, features and advantages of the present invention will become apparent from the following detailed description taken with the accompanying drawings.

DETAILED DESCRIPTION OF THE PREFERRED EMBODIMENTS

Figure 1:
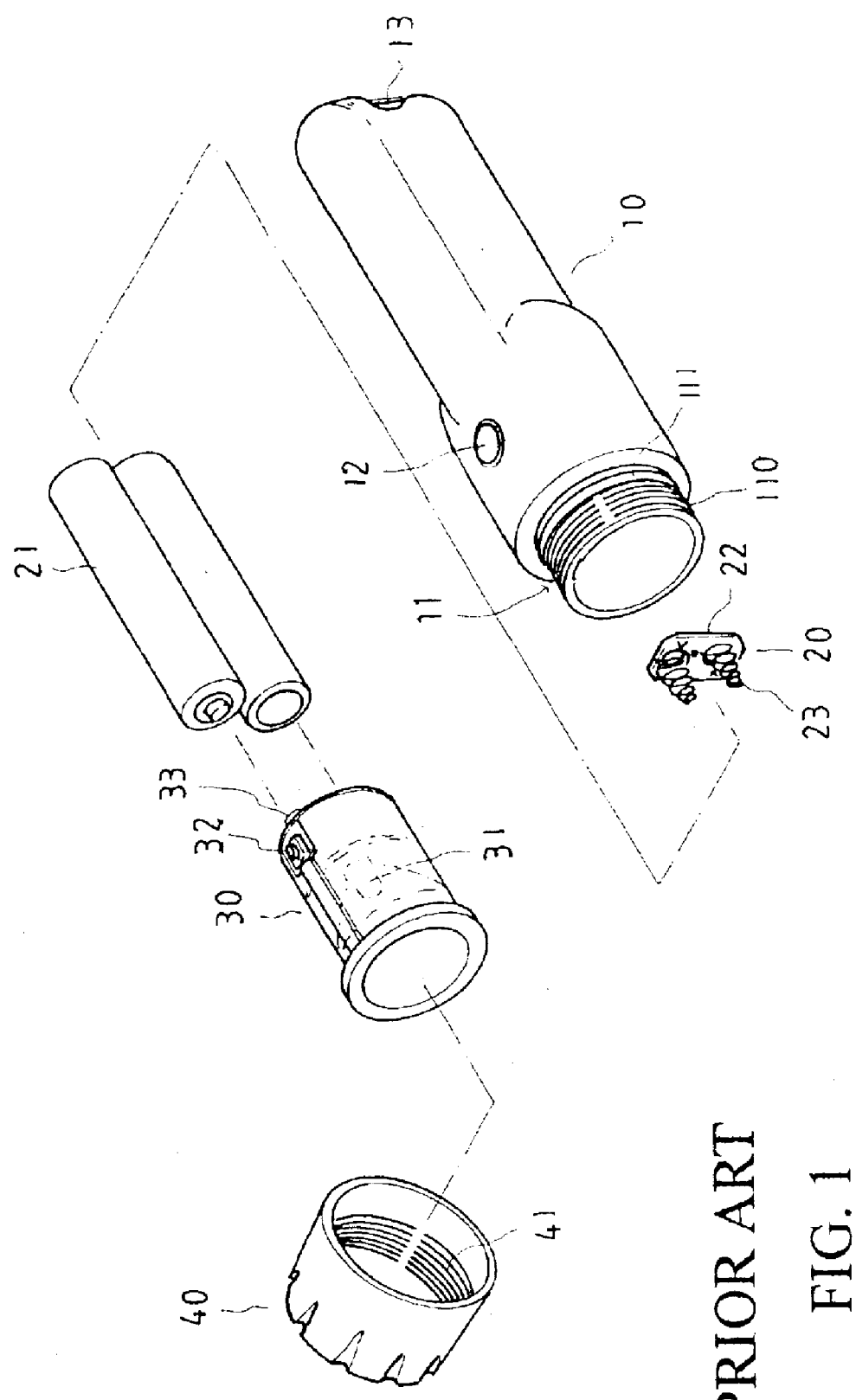
FIG. 1 is an exploded view of a conventional flashlight.
Figure 2:
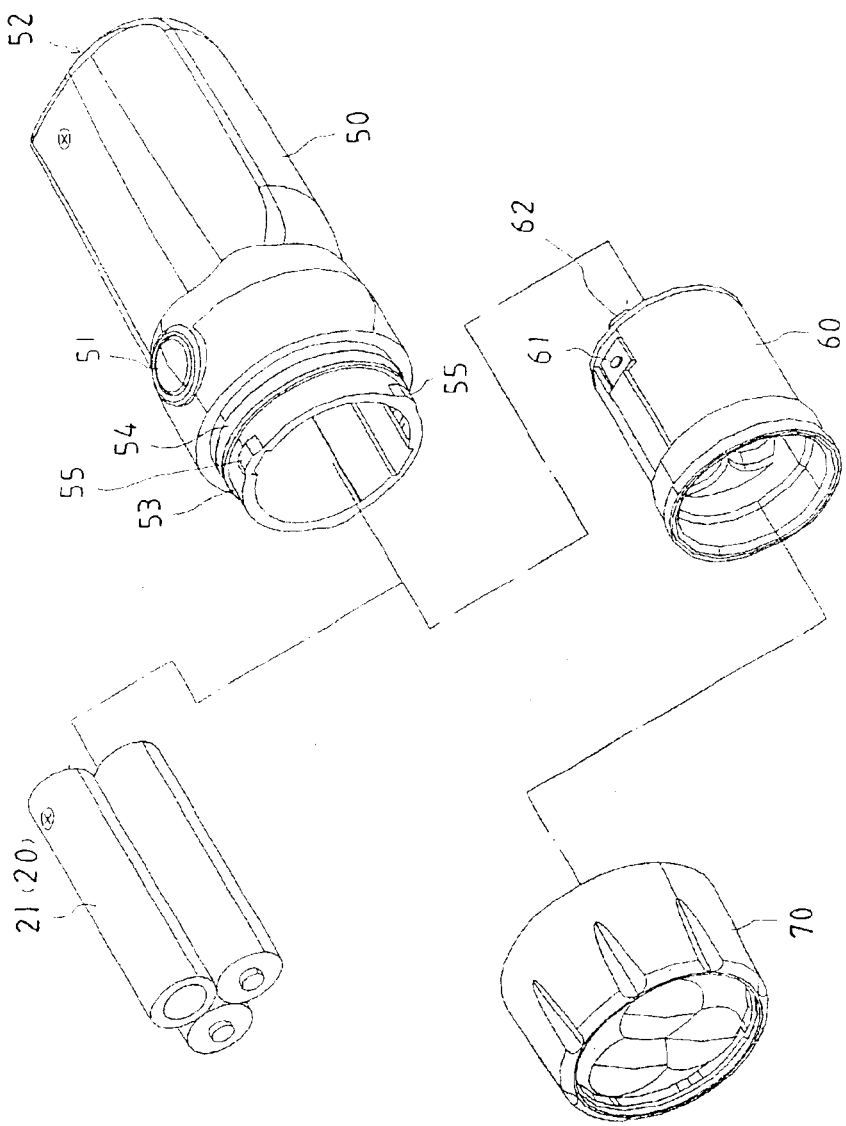
FIG. 2 is an exploded view of a flashlight according to the invention.
Figure 3:
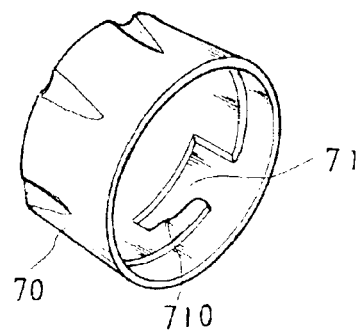
FIG. 3 is a rear perspective view of a head assembly shown in FIG. 2.
Figure 4:
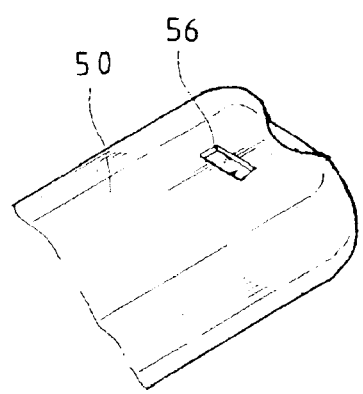
FIG. 4 is a bottom perspective view of a portion of a battery compartment for showing a slot.
Figure 5:
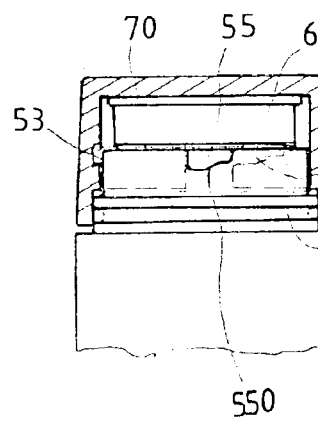
FIG. 5 is a cross-sectional view, a projection and a recess being shown during engaging.
Figure 6:
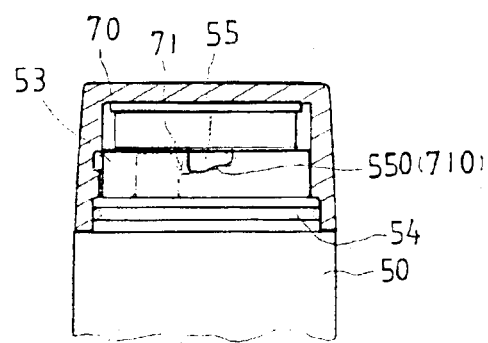
FIG. 6 is a view similar to FIG. 5, the projection and the recess being engaged.

Referring to FIGS. 2, 3, 4, 5, 6, and 10 a flashlight constructed in accordance with the invention is shown. The flashlight comprises a battery compartment 50 including a forward cylindrical shoulder extension 53, a plurality of projections 55 (three are shown) equally spaced apart around the shoulder extension 53, each projection 55 having two arcuate side slopes 550, an O-ring 54 behind the projections 55, a waterproof button 51 on an outer surface, a rear holed tab 52 for connection to a lanyard 57 so as to facilitate carrying, and a bottom slot 56, a battery assembly 20 including three cells 21, a board (not shown), and three coil springs (not shown), a cylindrical LED carrier assembly 60 anchored in a forward portion of the battery compartment 50, the LED carrier assembly 60 including three internal LEDs (not shown), a circuitry (not shown), three rear contacts 62 electrically interconnecting the cells 21 and the LEDs, and a top switch 61 engaged with the button 51 so that a pressing of the button 51 can cause the switch 61 to either turn on the LEDs for blinking to be served as warning light of bicycle (as detailed later) or turn off the LEDs, and a cylindrical head assembly 70 including a front lens for projecting light and three inner L-shaped recesses 71 each having an arcuate section 710 for facilitating the projection 55 to engage with the recess 71 by passing the arcuate side slope 550 through the arcuate section 710 when turning the head assembly 70 a small angle relative to the battery compartment 50 after engaging. As a result, the head assembly 70 and the battery compartment 50 are secured together and a water-tight seal is maintained by compressing the O-ring 54. Such engagement is reliable. Further, disengagement of the head assembly 70 from the battery compartment 50 can be carried out quickly for cell replacement.

Figure 9:
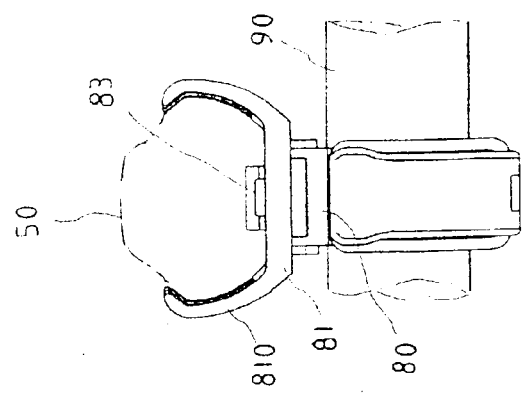
FIG. 9 is another side plan view of the fastened clip device, the flashlight, and the crossbar.
Figure 8:
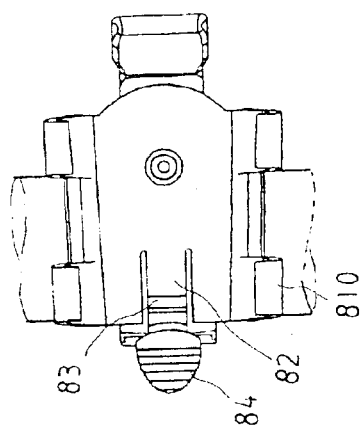
FIG. 8 is a top plan view of the fastened clip device, the flashlight, and the crossbar.
Figure 7:
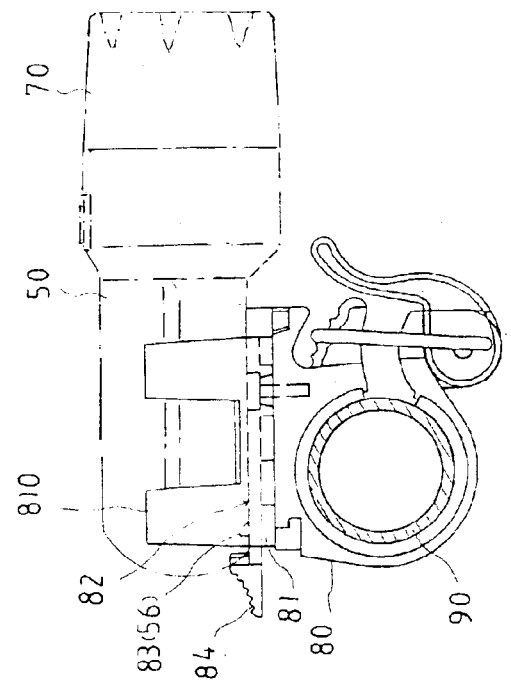
FIG. 7 is a side plan view of the flashlight secured to a crossbar of bicycle by means of a first preferred embodiment of clip device according to the invention.

Referring to FIGS. 7, 8, and 9, a first preferred embodiment of clip device 80 according to the invention is shown. The clip device 80 is provided to secure the flashlight to a bicycle component (e.g., crossbar) 90. In detail, the clip device 80 comprises a ring sleeved around the crossbar 90, a latch fastener for fastening the ring on the crossbar 90, an upper seat 81 having two pairs of arcuate wings 810 for clamping the battery compartment 50, a resilient piece 82 on a forward side of the seat 81, a latch member 83 on the resilient piece 82, the latch member 83 being adapted to insert into the slot 56 for fastening the flashlight, and a flexible tab 84 extended forwardly from the seat 81, the tab 84 being adapted to press down to clear the latch member 83 from the slot 56 for disengaging the flashlight from the clip device 80.

Figure 10:
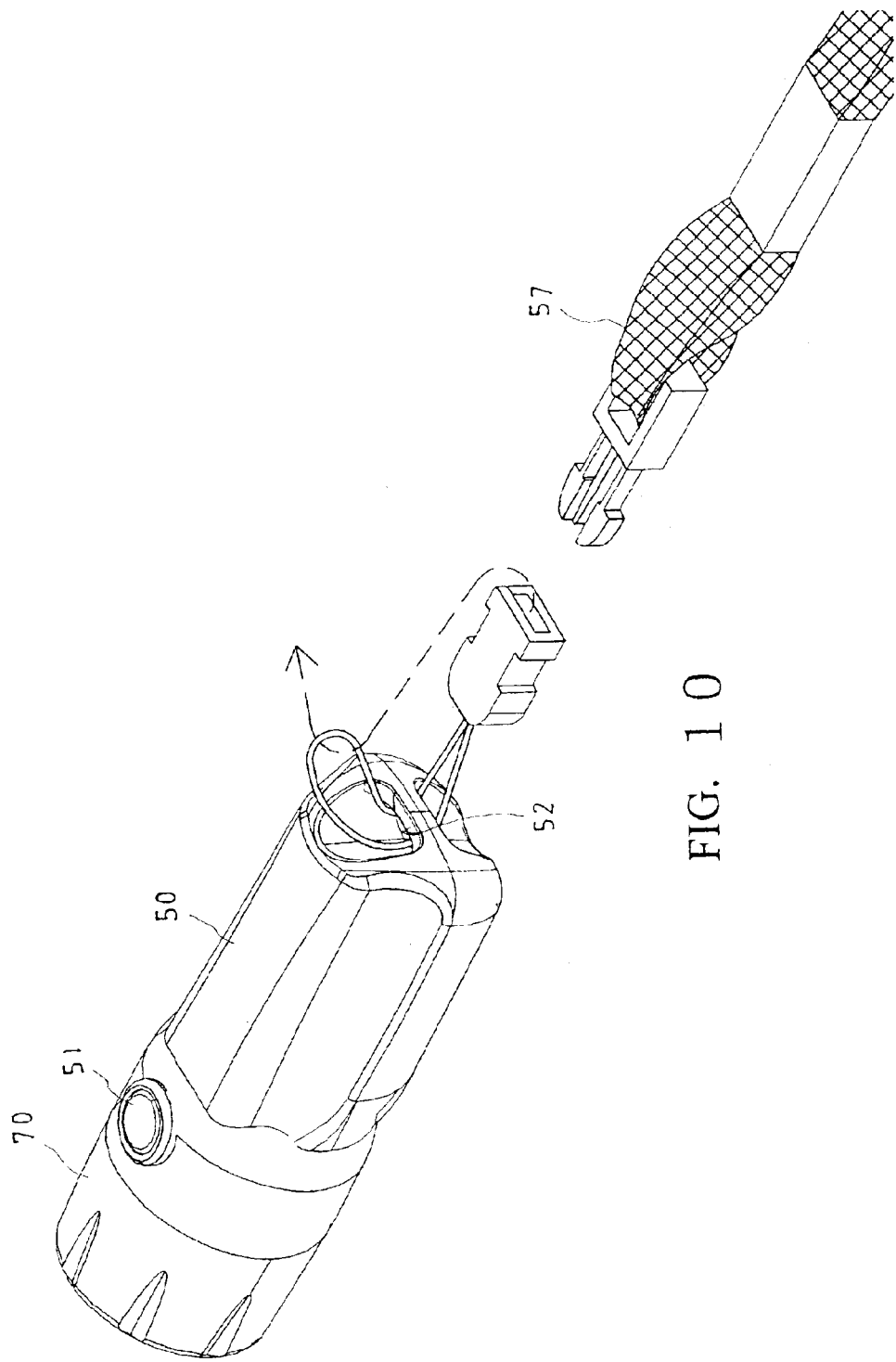
FIG. 10 is a perspective view of the flashlight illustrating a connection to a lanyard at its rear holed tab.
Figure 12:
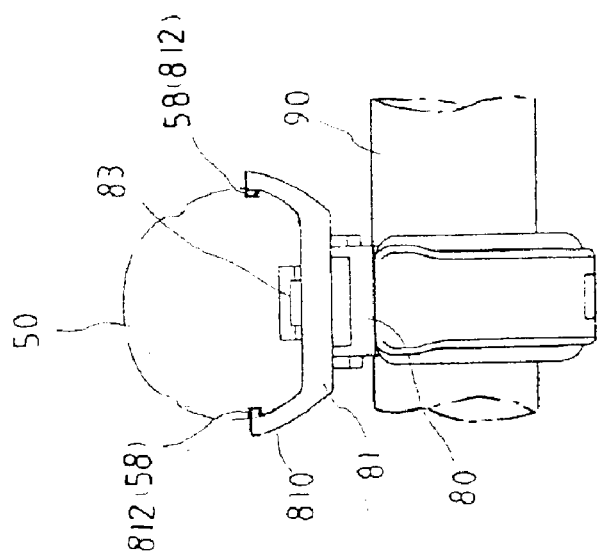
FIG. 12 is another side plan view of the fastened clip device shown in FIG. 11, the flashlight, and the crossbar.
Figure 11:
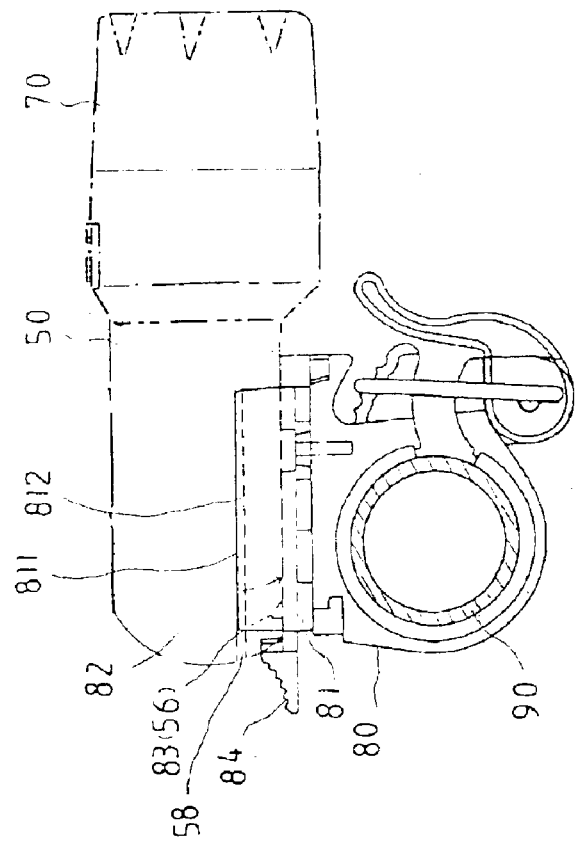
FIG. 11 is a side plan view of the flashlight secured to the crossbar of bicycle by means of a second preferred embodiment of clip device according to the invention.

Referring to FIGS. 10 and 11, a second preferred embodiment of clip device according to the invention is shown. The second preferred embodiment substantially has same structure as the first preferred embodiment. The differences between the first and the second preferred embodiments, i.e., the characteristics of the second preferred embodiment are detailed below. Two arcuate wings 810 are formed. Each wing 810 comprises a lengthwise flange 811 and a lengthwise claw 812 which is engageable with a lengthwise groove 58 at either side of the battery compartment 50. Such engagement is more reliable.

While the invention herein disclosed has been described by means of specific embodiments, numerous modifications and variations could be made thereto by those skilled in the art without departing from the scope and spirit of the invention set forth in the claims.

What is claimed is:

1. A warning light of a bicycle, comprising:
   a flashlight comprising:
   a battery compartment including a forward cylindrical shoulder extension, a plurality of projections equally spaced apart around the shoulder extension, each projection having two arcuate side slopes, an O-ring behind the projections, a waterproof button on an outer surface, a rear holed tab for connection to a lanyard, and a bottom slot;
   a battery assembly including a plurality of cells;
   a cylindrical LED carrier assembly anchored in a forward portion of the battery compartment, the LED carrier assembly including a plurality of internal LEDs, a plurality of rear contacts electrically interconnecting the cells and the LEDs, and a top switch engaged with the button so that a pressing of the button causes the switch to either turn on the LEDs for blinking or turn off the LEDs; and
   a cylindrical head assembly including a front lens for projecting light and a plurality of inner recesses each having an arcuate section for facilitating the projection to engage with the recess by passing the arcuate side slope through the arcuate section when turning the head assembly an angle relative to the battery compartment after engaging; and
   a clip assembly comprising a ring sleeved around a tube component of the bicycle, a latch fastener for fastening the ring on the tube component, an upper seat having two pairs of arcuate wings for clamping the battery compartment, a resilient piece on a forward side of the seat, a latch member on the resilient piece, the latch member being adapted to insert into the slot for fastening the flashlight, and a flexible tab extended forwardly from the seat, the tab being adapted to press down to clear the latch member from the slot for disengaging the flashlight from the dip assembly.

2. The warning light of claim 1, wherein each of the recesses is shaped as an L.

3. A warning light of a bicycle, comprising:
   a flashlight comprising:
   a battery compartment including a forward cylindrical shoulder extension, a plurality of projections equally spaced apart around the shoulder extension, each projection having two arcuate side slopes, an O-ring behind the projections, a waterproof button on an outer surface, a rear holed tab for connection to a lanyard, a bottom slot, and a lengthwise groove at either side thereof;
   a battery assembly including a plurality of cells;
   a cylindrical LED carrier assembly anchored in a forward portion of the battery compartment, the LED carrier assembly including a plurality of internal LEDs, a plurality of rear contacts electrically interconnecting the cells and the LEDs, and a top switch engaged with the button so that a pressing of the button causes the switch to either turn on the LEDs for blinking or turn off the LEDs; and a cylindrical head assembly including a front lens for projecting light and a plurality of inner recesses each having an arcuate section for facilitating the projection to engage with the recess by passing the arcuate side slope through the arcuate section when turning the head assembly an angle relative to the battery compartment after engaging; and a dip assembly comprising a ring sleeved around a tube component of the bicycle, a latch fastener for fastening the ring on the tube component, an upper seat having an arcuate wing at either side, each wing having a lengthwise top claw engaged with the lengthwise groove for clamping the battery compartment, a resilient piece on a forward side of the seat, a latch member on the resilient piece, the latch member being adapted to insert into the slot for fastening the flashlight, and a flexible tab extended forwardly from the seat, the tab being adapted to press down to clear the latch member from the slot for disengaging the flashlight from the clip assembly.

4. The warning light of claim 3, wherein each of the recesses is shaped as an L.

* * * * *